UNITED STATES PATENT OFFICE.

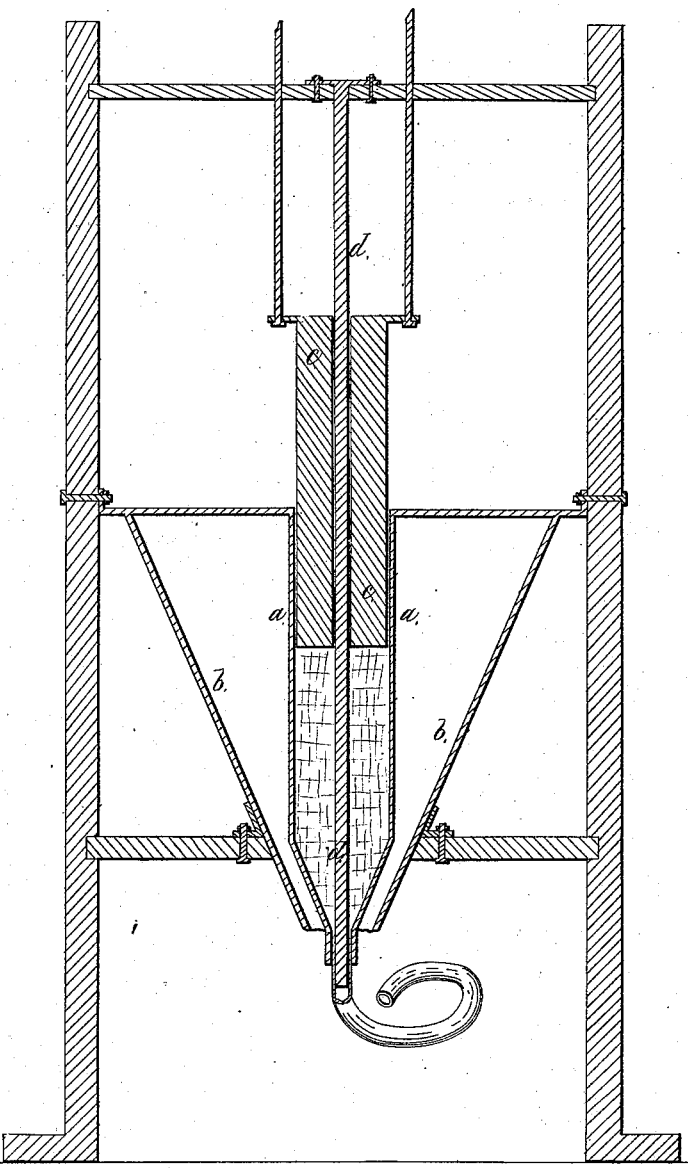

JNO. H. CHEEVER, OF BOSTON, MASSACHUSETTS.

MANUFACTURE OF RUBBER HOSE-PIPE.

Specification of Letters Patent No. 22,854, dated February 8, 1859.

*To all whom it may concern:*

Be it known that I, JOHN H. CHEEVER, of Boston, in the county of Suffolk and State of Massachusetts, have invented a new and useful Method or Process of Manufacturing India-Rubber Hose or Pipes, and that the following description, taken in connection with the accompanying drawings hereinafter referred to, forms a full and exact specification of the same, wherein I have set forth the nature and principles of my said invention by which it may be distinguished from others of a similar class, together with such parts as I claim and desire to have secured to me by Letters Patent.

My improvement consists in a new method or process of manufacturing india rubber hose or pipes. The only mode heretofore practiced of manufacturing india rubber hose, has been by rolling sheets of rubber or cloth covered with rubber around a wooden or metallic rod. This mode is expensive and laborious, and the product is always imperfect, because the pipe when made of rubber alone, lacks strength to withstand the pressure of the water, and when formed with folds of cloth, the water forces itself between the folds, and soon destroys the pipe. The hose formed of folds of cloth is the only kind in general use, and the principal objection to it, is its perishable nature. The action of the water is peculiar,—by the constant pressure it is forced between the folds of the cloth and is absorbed into the threads, and soon destroys the hose. This difficulty is so serious, that it is only for want of a substitute, that india rubber hose is used at all.

My new and improved hose is made by machinery in a much cheaper and more expeditious manner, and is produced without any seams or joints, and without any folds of cloth to expose it to decay.

The material of which my hose is composed, is India rubber mixed with fibers of cotton or flax. This compound, prepared as hereinafter described, is placed in a strong iron box or case, having a cylindrical receiver which is made of a size suitable to receive a sufficient quantity of fibrous rubber, and has, at the bottom, a small hole which is to regulate the outside diameter of the hose. In this aperture is suspended an iron rod, which is of the size of the inside of the hose, and projects about an inch below the aperture. Upon this rod a plunger or piston plays up and down, and by its action, the rubber is slowly and gradually forced through the small hole at the bottom of the receiver, and passing around the rod above described, the hose is perfectly formed.

To illustrate the process of my manufacture, and the operation of the machine, I refer to the annexed drawing, which is a central vertical section of the machine employed.

*a a* represents a metallic cylinder, which is to be filled with the rubber compound prepared as hereinafter described. This is surrounded with a steam jacket *b b*.

*c c* is a piston or plunger which fits the cylinder *a a*, and has extending through it, a fixed mandrel *d d*, which also extends through the cylinder *a a*, as shown in the drawings.

The rubber compounded as hereinafter described, is placed in the cylinder surrounding the mandrel. It will be seen that on the descent of the piston *c c*, the rubber compound will be forced downward through the tapering aperture of the cylinder, and by this means will be formed into the required shape, the mandrel serving to impart the necessary diameter or bore to the hose.

It is obvious that the form of this machine can be varied at pleasure by any competent mechanic, for the only object is by pressure to form a tube or hose without seams or joints, and this having been discovered by me, the machinery for the same object can be infinitely varied. The form of the receiver that I prefer, is about eight inches inside diameter, and about thirty inches in length; about eight inches at the lower part should taper gradually and regularly to the small orifice, for the proper formation of the hose. The receiver should be formed of iron of sufficient strength to resist the pressure of the machinery, and should be surrounded with an outer casing of iron, commonly called a "steam jacket," into which steam should be conducted to keep the receiver at a regular heat of about 150°; this is necessary to facilitate the working of the rubber, and to produce hose or pipe of equal consistency throughout.

The formation of the compound, of which my hose is made, is a very important part of my invention, and my object is by combining fibers of cotton or flax with the rubber, to give it strength and flexibility, and at the same time, partially to destroy its elasticity, as the natural elasticity of pure rubber, would allow the hose to swell too much under the pressure of water. To accomplish this, I take the rubber, when compounded with sulfur in any of the ordinary compounds used in vulcanized rubber goods, and when it is in the state ready to be submitted to the vulcanizing heat, that is, a substance like stiff dough or paste, mix it with the fibers of cotton and flax, by grinding the materials between heated rollers in the mode usually practiced by rubber manufacturers, until the fiber is thoroughly incorporated with the rubber. The proportion I prefer is three pounds of rubber compound to one pound of flax or cotton, although these proportions may be varied according to the quality of the fabric. Instead of mixing pure cotton or flax with the rubber, an economical and simple method of obtaining a like result, is that of grinding between heated rollers, the rags or scraps of cloth covered with rubber compound, which are made to waste by manufacturers of shoes and other rubber goods. To these rags may be added, in grinding, more or less rubber compound, according to the nature of the rags, and the quality of the fabric desired.

The fibrous compound, obtained in either of the above described modes, is passed through heated calender rolls, and formed into a sheet. In this process of passing the fabric through the heated calender rolls, the fibers of the cotton or flax are laid in a direction parallel to the length of the sheet, then I take a similar sheet, prepared in the same way, and cut it into pieces as long as the width of the first sheet; these pieces are cut with beveled edges, and laid crosswise on the first sheet with the edges overlapping each other. The third sheet, similar to the first described, is then laid on top; the whole is then again passed through the heated calender rolls, for the purpose of consolidating and uniting the fabric. These sheets of fibrous compound, having a portion of the fibres running lengthwise and a portion crosswise, are cut of proper length and width, and then rolled tightly around the iron rod above referred to, which regulates the size of the inside of the hose, and thus forms a solid cylinder of fibrous rubber which is to be placed in the receiver, ready to be forced through the aperture by the action of the plunger or piston. By this careful arrangement of the fibers in the cylinder, the fibers in the hose take a similar arrangement, and being irregularly disposed through the substance of the pipes, partially destroy the natural elasticity of the rubber and enable it to resist pressure. A very good result can be produced without crossing the fibers, but I consider the process described to produce the best and most perfect article. Nor is the careful preparation of the cylinder of rubber to be placed in the receiver indispensable, as the fibrous rubber forms a substance like stiff dough, or paste, which can be placed in a mass in the receiver and forced through it in the manner above described, although I prefer the former method. After the hose is formed, it is cut into the required lengths, and placed upon a metal rod or tube, and submitted in a proper heater, to the usual process of vulcanizing, a process well known to all rubber manufacturers.

Having thus described my process I desire to state that the leading feature of my invention is the method of forming the tube or hose by powerful pressure applied to the fibrous compound when it is in a plastic state, thus forcing it by proper machinery into the required form, a seamless solid hose, formed of the fibrous compound herein above specified, having never before been known.

Having thus described by improvement I shall state my claim as follows:

I do not claim the vulcanizing process, or any compounds of rubber hereinabove referred to, because with the exception of the cross fiber compound they are old, nor heating the hose or pipes on rods or tubes of iron;—nor any peculiarity in the construction of the machine,—neither do I intend in this application to claim forming a cross fibered fabric, as these will constitute the subjects of other patents; but What I do claim as my invention, and desire to have secured to me by Letters Patent is—

The new article of manufacture consisting of hose or pipe made of fibrous rubber by powerful pressure and without seams or joints substantially as above described.

JOHN H. CHEEVER.

Witnesses:
 EZRA LINCOLN,
 JOSEPH GARRETT.